(12) United States Patent
Andrews et al.

(10) Patent No.: US 10,659,320 B2
(45) Date of Patent: May 19, 2020

(54) DEVICE MANAGEMENT SYSTEM

(71) Applicant: Dell Products L.P., Round Rock, TX (US)

(72) Inventors: Carlton Andrews, Austin, TX (US); Gregory James Breinholt, Singapore (SG); Karthik Krishnakumar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 15/626,894

(22) Filed: Jun. 19, 2017

(65) Prior Publication Data

US 2017/0288985 A1    Oct. 5, 2017

Related U.S. Application Data

(63) Continuation of application No. 14/166,368, filed on Jan. 28, 2014, now Pat. No. 9,736,037.

(51) Int. Cl.
*H04L 12/24* (2006.01)

(52) U.S. Cl.
CPC ...... *H04L 41/5064* (2013.01); *H04L 41/0836* (2013.01)

(58) Field of Classification Search
CPC .................. H04L 41/0836; H04L 41/5064
USPC ........................................................ 709/223
See application file for complete search history.

(56) References Cited

U.S. PATENT DOCUMENTS

| | | | |
|---|---|---|---|
| 8,694,693 B2 | 4/2014 | Lambert et al. | |
| 8,812,622 B2* | 8/2014 | Callaway | H04L 67/00 375/219 |
| 8,826,003 B2* | 9/2014 | Gearhart | H04L 63/0485 709/238 |
| 8,880,766 B2 | 11/2014 | Brundridge et al. | |
| 8,953,617 B2 | 2/2015 | Nguyen et al. | |
| 8,958,340 B2* | 2/2015 | Bao | H04L 41/046 370/252 |
| 9,330,236 B2* | 5/2016 | Kusens | G06F 19/328 |
| 9,348,649 B2* | 5/2016 | Stevens | G06F 15/167 |
| 9,400,670 B2* | 7/2016 | Stevens | G06F 9/45558 |
| 2005/0215153 A1 | 9/2005 | Cossement et al. | |
| 2011/0145434 A1* | 6/2011 | Ringen | H04L 45/00 709/238 |
| 2014/0122717 A1 | 5/2014 | Andrews et al. | |

* cited by examiner

*Primary Examiner* — Kristie D Shingles
(74) *Attorney, Agent, or Firm* — Haynes and Boone, LLP

(57) ABSTRACT

A device management system includes a system management information handling system (IHS) that is coupled to a network. A first device is included in the device management system and is not configured to communicate with the system management IHS. A plurality of user IHSs are each configured to communicatively couple to the first device and are each configured to communicatively couple to the system management IHS through the network. Each of the plurality of user IHSs is configured to retrieve device information from the first device when that user IHS is communicatively coupled to the first device. Each of the plurality of user IHSs is configured to provide the device information for the first device to the system management IHS when that user IHS is communicatively coupled to the system management IHS through the network.

20 Claims, 11 Drawing Sheets

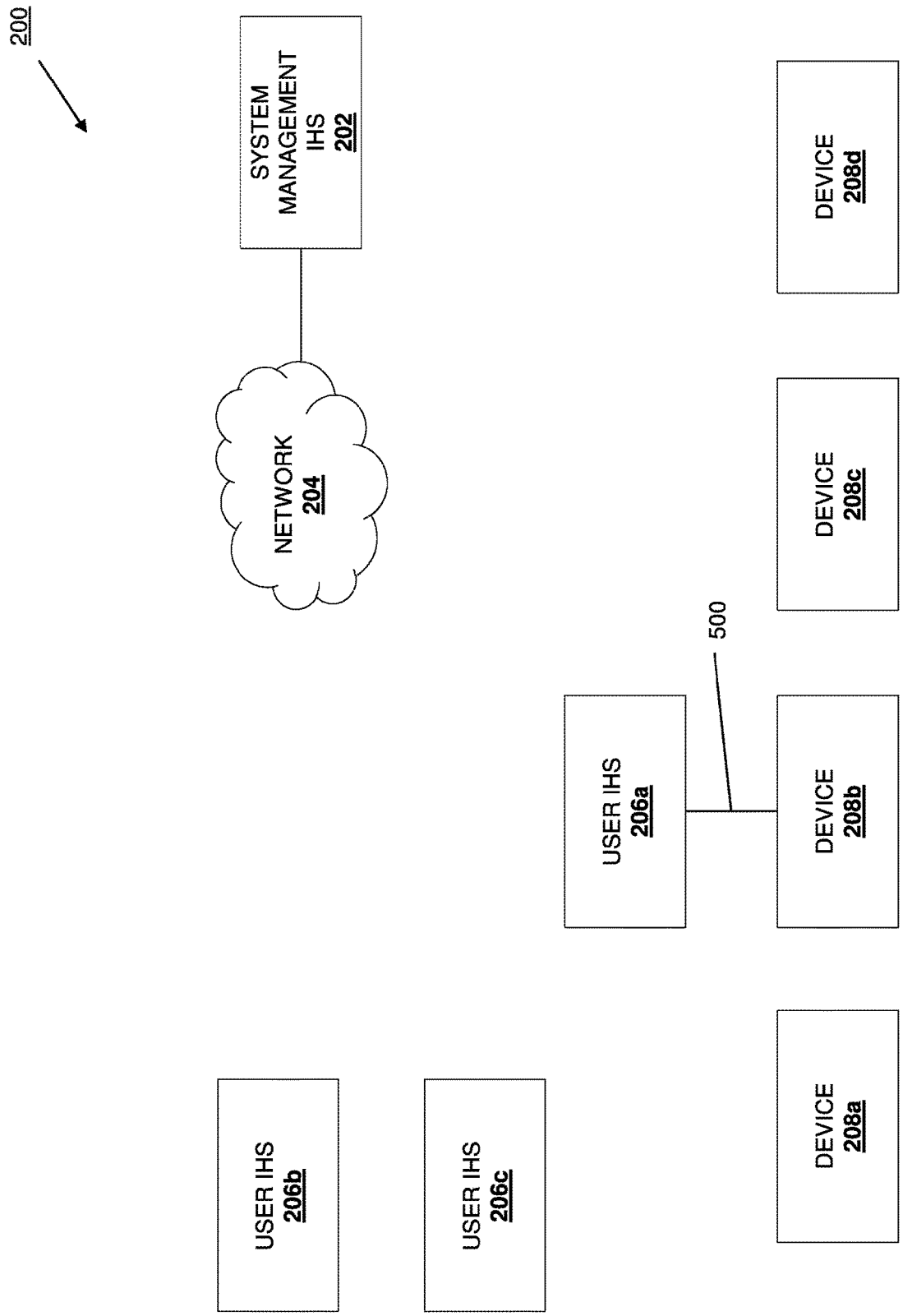

DEVICE MANAGEMENT SYSTEM

CROSS-REFERENCE TO RELATED APPLICATIONS

This is a Continuation application to U.S. Utility application Ser. No. 14/166,368 filed Jan. 28, 2014, entitled "Device Management System,", the disclosure of which is incorporated herein by reference in its entirety.

BACKGROUND

The present disclosure relates generally to information handling systems, and more particularly to system and methods to manage devices using information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Management IHSs are sometimes provided to manage groups of user IHSs to provide what are sometimes referred to as managed IHS environments. For example, a business may provide a managed IHS environment that includes a management IHS coupled to a network (e.g., a local area network (LAN)), and that management IHS may manage user IHSs that are coupled to the network by, for example, providing software updates, detecting hardware issues, ensuring security policies are enforced, and/or a variety of other management tasks known in the art. In managed IHS environments, there are typically multiple devices that may not be managed or even inventoried by the management IHS. For example, in the business-provided managed IHS environment discussed above, a variety of different peripheral devices such as, for example, projectors, televisions, displays, printers, and/or other devices known in the art may not be connected to the network and/or not have the capability to communicate with the management IHS. The inability of the management IHS to manage or even inventory those devices can raise a number of issues.

For example, in the event of a failure or other issue with a peripheral device that is not connected to and/or otherwise cannot communicate with the management IHS, an administrator or other agent of the business must rely on users to report those issues. For example, a user may be required to provide a trouble ticket to an Information Technology (IT) department of the business, and then IT personnel must then respond to the trouble ticket to remedy the issue. As such, there is no immediately visibility of the issue, particularly when users fail to report devices that are experiencing issues. In addition, the need to report a trouble ticket and respond to the reported trouble ticket is associated with down time (or faulty operation) of devices having issues, which can affect the productivity of the business. For example, a business may include projectors and printers that are not connected to the network and/or are otherwise unable to communicate with the management IHS, and a projector may experience a failed lamp or a printer may run out of sufficient toner. The need to wait for a user to report such problems, and the time it takes to response to such a report, can results in an inability to use the projector or printer for a significant amount of time.

Accordingly, it would be desirable to provide improved systems and methods for managing devices.

SUMMARY

According to one embodiment, a device management system includes a system management information handling system (IHS) that is coupled to a network; a first device that is not configured to communicate with the system management IHS; and a plurality of user IHSs that are each configured to communicatively couple to the first device and that are each configured to communicatively couple to the system management IHS through the network, wherein each of the plurality of user IHSs is configured to retrieve device information from the first device when that user IHS is communicatively coupled to the first device, and wherein each of the plurality of user IHSs is configured to provide the device information for the first device to the system management IHS when that user IHS is communicatively coupled to the system management IHS through the network.

BRIEF DESCRIPTION OF THE DRAWINGS

FIG. 5a is a schematic view illustrating an embodiment of a first user IHS retrieving device information from a device in the device management system of FIG. 2.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
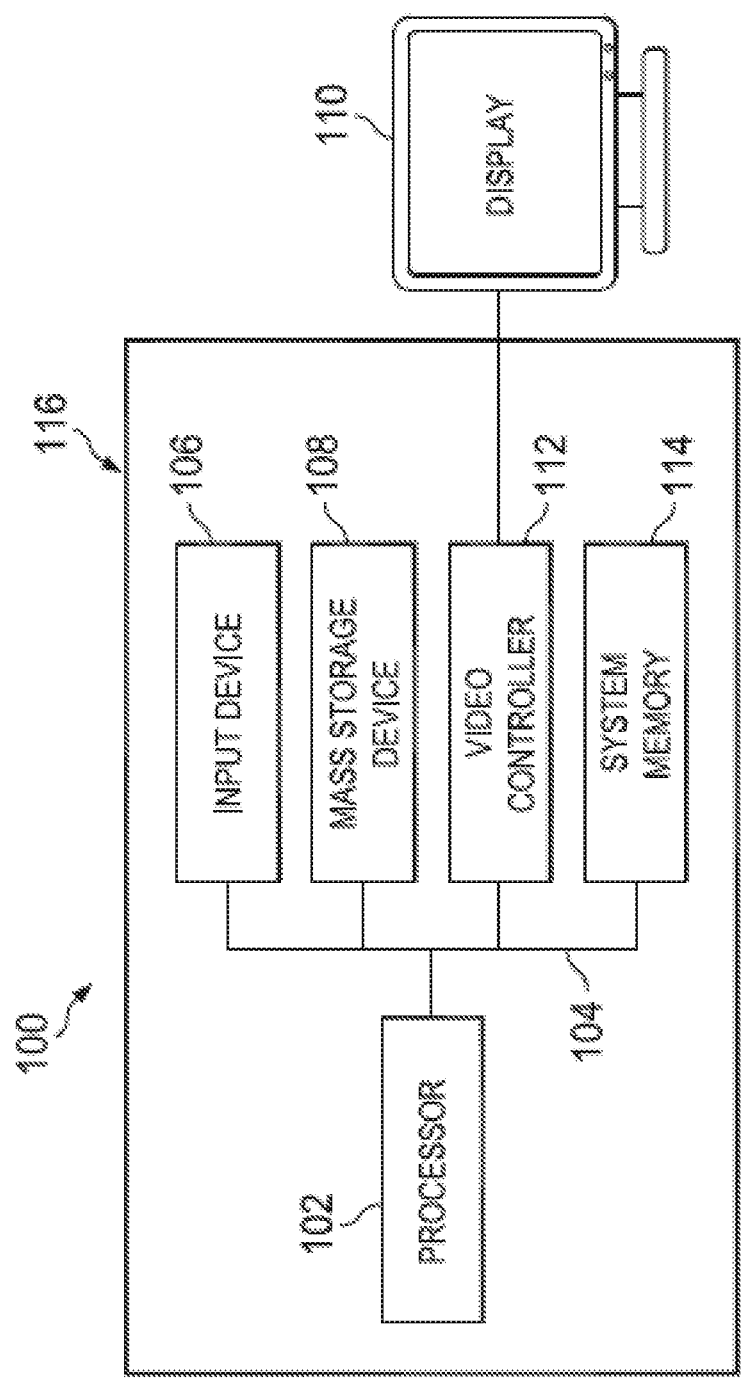
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
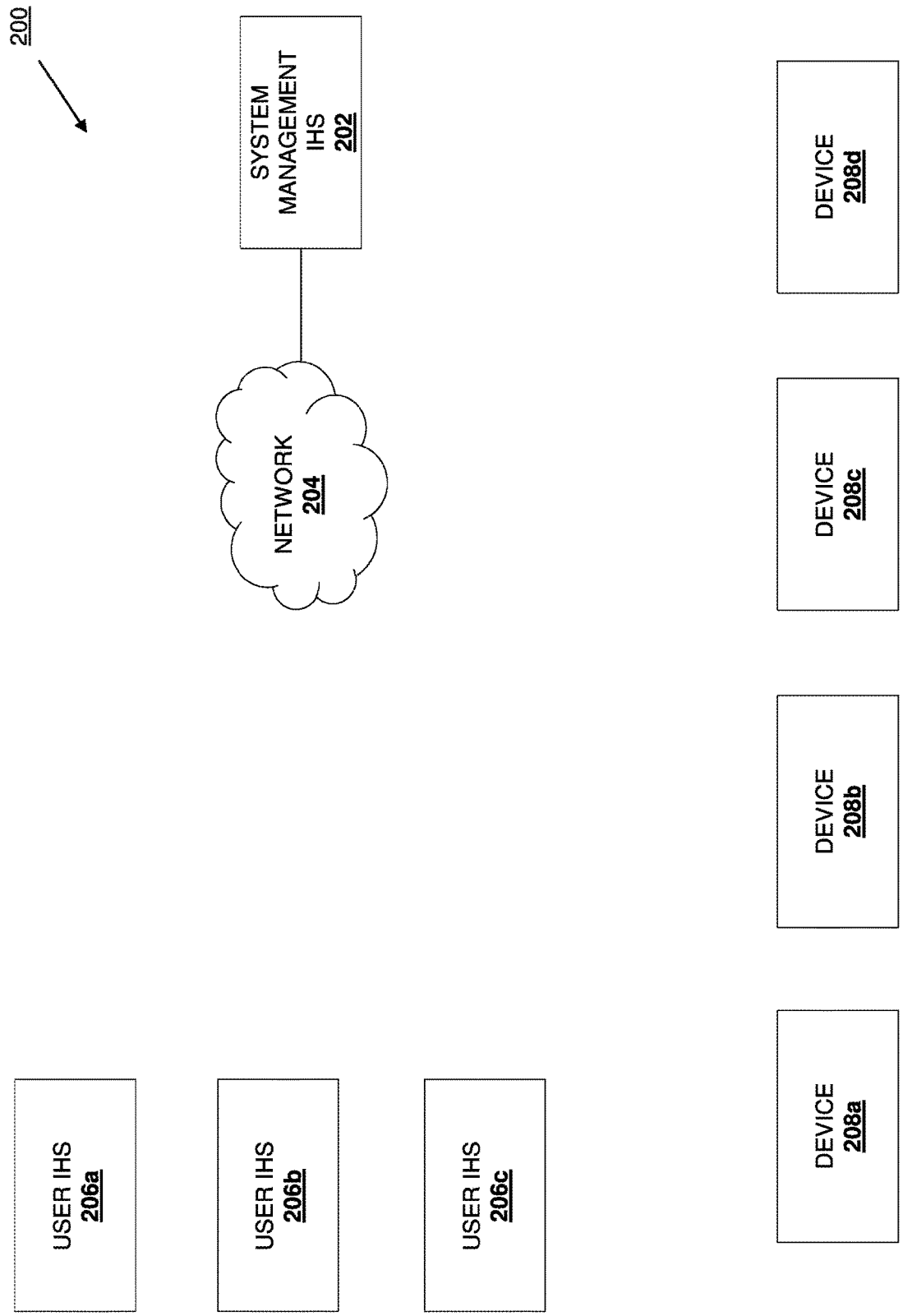
FIG. 2 is a schematic view illustrating an embodiment of a device management system.

Referring now to FIG. 2, an embodiment of a device management system 200 is illustrated. The device management system 200 includes a system management IHS 202 that may be the IHS 100 discussed above with reference to FIG. 1 and/or may include some or all of the components of the IHS 100. The system management IHS 202 may include a processing system (e.g., the processor 102) and a memory system (e.g., the system memory 114) that includes instructions that, when executed by the processing system, cause the processing system to provide a system manager engine that performs the functions of the system management IHS 202 that are discussed below. The system management IHS 202 is connected to a network 204 such as, for example, a local area network (LAN), the Internet, and/or a variety of other networks known in the art. The device management system 200 also includes a plurality of user IHSs 206a, 206b, and 206c, each of which may be the IHS 100 discussed above with reference to FIG. 1 and/or may include some or all of the components of the IHS 100. The user IHSs 206a-c may include processing systems (e.g., the processor 102) and memory systems (e.g., the system memory 114) that includes instructions that, when executed by the processing systems, cause the processing systems to provide device information transmission engines that perform the functions of the user IHSs 206a-c that are discussed below.

The device management system 200 also includes a plurality of devices 208a, 208b, 208c, and 208d. In the embodiments discussed below, the user IHSs 206a-c are mobile user IHSs that are configured to connect to the network 204 and that are configured to connect to the devices 208a-d using wired or wireless connectivity techniques known in the art. However, the user IHSs may be different types of IHSs such as, for example, desktop IHSs, server IHSs, and/or a variety of other IHSs known in the art. Furthermore, in the embodiments discussed below, the devices 208a-d are unable to communicate with the system management IHS 202 because they are not connected to the network 204. However, devices may be connected to the network 204 while being unable to communicate with the system management IHS 202 for a variety of different reasons such as, for example, a lack of software or configuration information that allows communication between that device and the system management IHS 202.

One of skill in the art will recognize that the device management system 200 may be provided in a variety of IHS environments while remaining within the scope of the present disclosure. For example, the device management system 200 may be provided in a business environment in which the user IHSs 206a-c are provided to employees and the devices 208a-d are IHS peripheral devices or other devices that may be shared by employees using the user devices 206a-c. In another example, the device management system 200 may be provided in a home environment in which the user IHSs 206a-c are provided to members of a family and the devices 208a-d are IHS peripheral devices or other devices that may be shared by family members using the user devices 206a-c. In yet another example, the device management system 200 may be provided in any IHS sharing environment in which the user IHSs 206a-c are provided to members of an IHS sharing network and the devices 208a-d are IHS peripheral devices or other devices that may be shared by sharing network members using the user devices 206a-c. While a few examples have been provided, one of skill in the art in possession of the present disclosure will recognize that any IHS/device environment may benefit from the teachings of the present disclosure and thus will fall within its scope. Furthermore, while the devices 208a-d discussed above have been described as being shared (e.g., utilized and/or controlled) by the user IHSs 206a-c, any or all of the devices 310-322 may simply be configured to communicate with the user IHSs 206a-c without being utilized or controlled. For example, any or all of the devices 208a-d may include communication systems (e.g., local communication systems such as Near Field Communication (NFC) systems, Bluetooth® communication systems, and/or a variety of other local communications systems known in the art; network communication systems; etc.) that are configured to communicate with the user IHSs 206a-c without the devices 208a-d including functionality that allows for control of the devices 208a-d by the user IHSs 206a-c.

Figure 3:
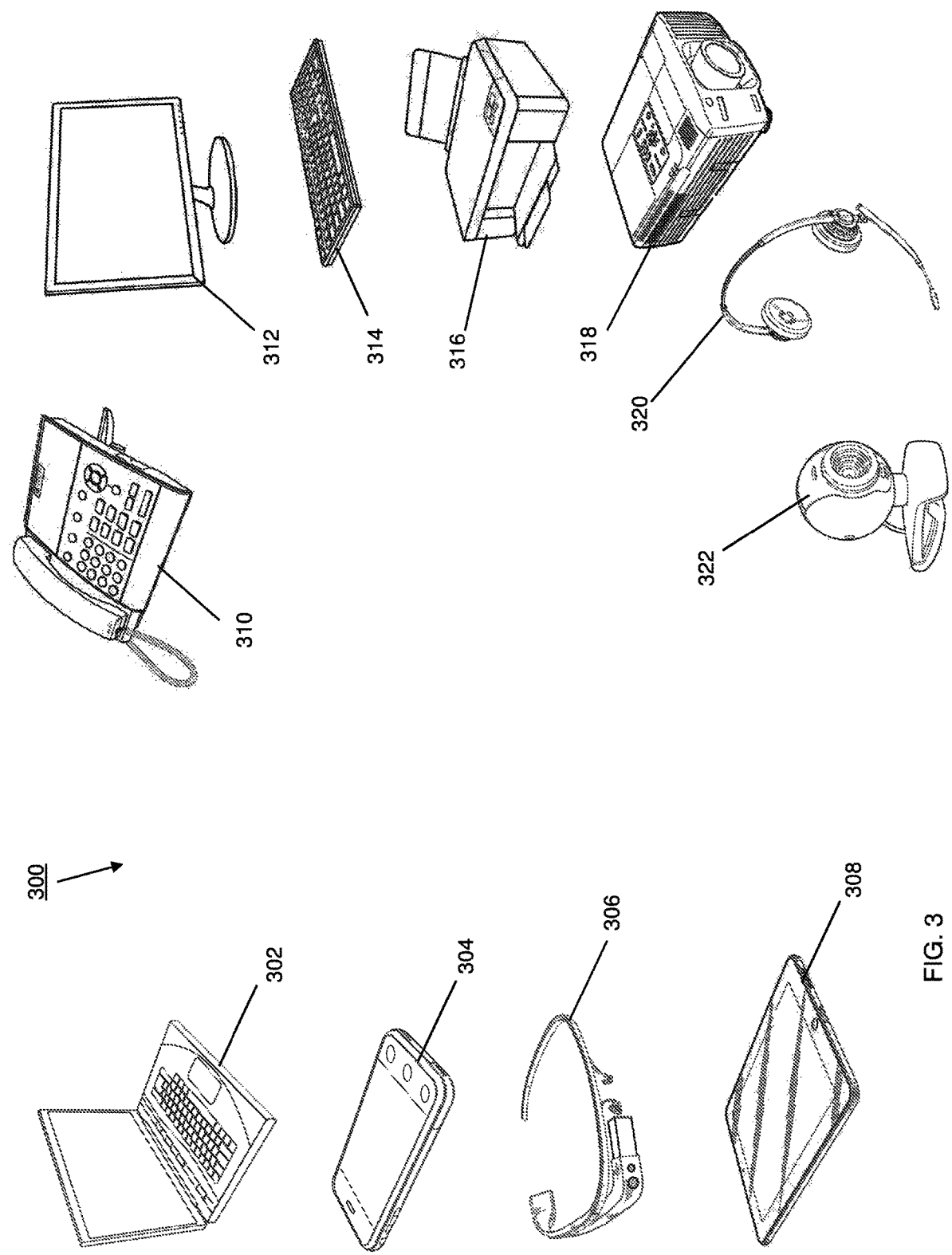
FIG. 3 is a schematic view illustrating an embodiment of a device management system.
Figure 4:
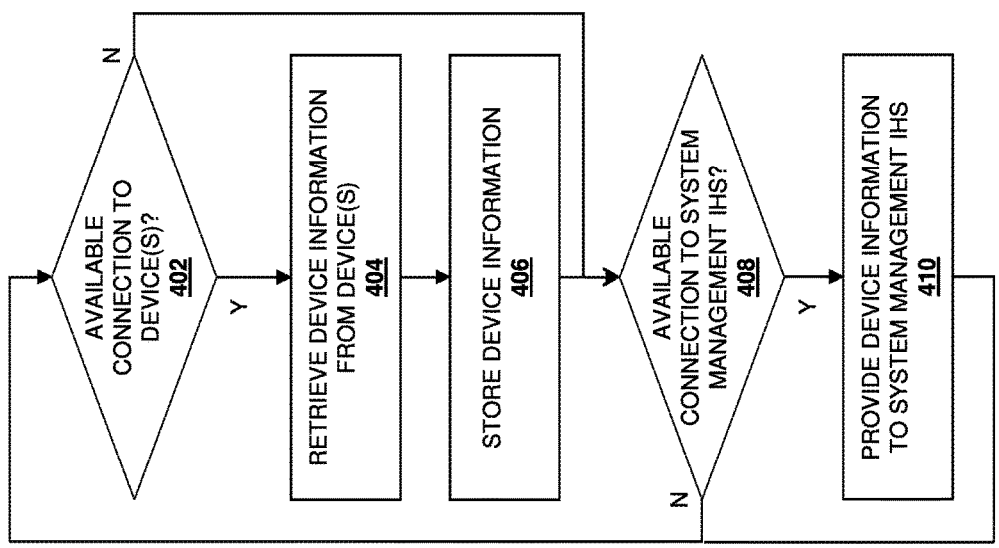
FIG. 4 is a flow chart illustrated an embodiment of a method for managing devices that may be performed by a user IHS.

Referring now to FIG. 3, an embodiment of a portion of a device management system 300 is illustrated to provide just a few examples of the user IHSs and devices that may be utilized in the device management systems of the present disclosure. The device management system 300 includes a laptop or notebook user IHS 302, a phone user IHS 304, a wearable user IHS 306, and a tablet user IHS 308. The device management system 300 also includes a phone device 310, a monitor or television device 312, an input device 314, a printer device 316, a projector device 318, a headset device 320, and a camera device 322. Each of the user IHSs 302-308 (and/or other user IHSs known in the art) may be provided to users in the device management system 300 and may be capable of wired and/or wireless communication with any of the devices 310-322 (and/or other devices known in the art), while those devices 310-322 may be incapable of communication with a system management IHS (e.g., the system management IHS 202 of FIG. 2) due to those devices 310-322 not being connected to a network that includes the system management IHS, due to those devices 310-322 not including software that allows for communication with the system management IHS, due to those devices 310-322 not including configuration information that provides for (or otherwise not being configured to) communicate with the system management IHS, and/or other communication limitations known in the art.

One of skill in the art in possession of the present disclosure will recognize that the devices 310-322 may be shared or dedicated devices used by any or all of the user IHSs 302-308. In some embodiments, any of the user devices 302-308 may be configured to communicate with the phone device 310 to utilize and/or control phone functions, the monitor or television device 312 to utilize and/or control monitor or television functions, the input device 314 utilize and/or control input functions, the printer device 316 to utilize and/or control printer functions, the projector device 318 to utilize and/or control projector functions, the headset device 320 to utilize and/or control headset functions, and the camera device 322 to utilize and/or control camera functions. For example, the user IHSs 302-308 and devices 310-322 may utilize local communication techniques such as NFC communication techniques or Bluetooth® communication techniques to provide for the utilization and/or control discussed above. In other embodiments, any of the user devices 302-308 may be configured to communicate with the devices 310-322 to exchange the device information discussed below without the need to provide for the utilization and/or control those devices 310-322. For example, the user IHSs 302-308 and devices 310-322 may utilize local communication techniques such as NFC communication techniques or Bluetooth® communication techniques to provide for the exchange of device information with user IHSs discussed below. While a few examples of devices are illustrated in FIG. 3, any device that is configured to communicate with a user IHS is envisioned as falling within the scope of the present disclosure, including but not limited to, thermostats, appliances (e.g., washing machines, drying machines, dishwashers, refrigerators, microwaves, ovens, etc.), vehicles (e.g., cars, motorcycles, bicycles, busses, etc.), and/or a variety of other devices known in the art.

Figure 5B:
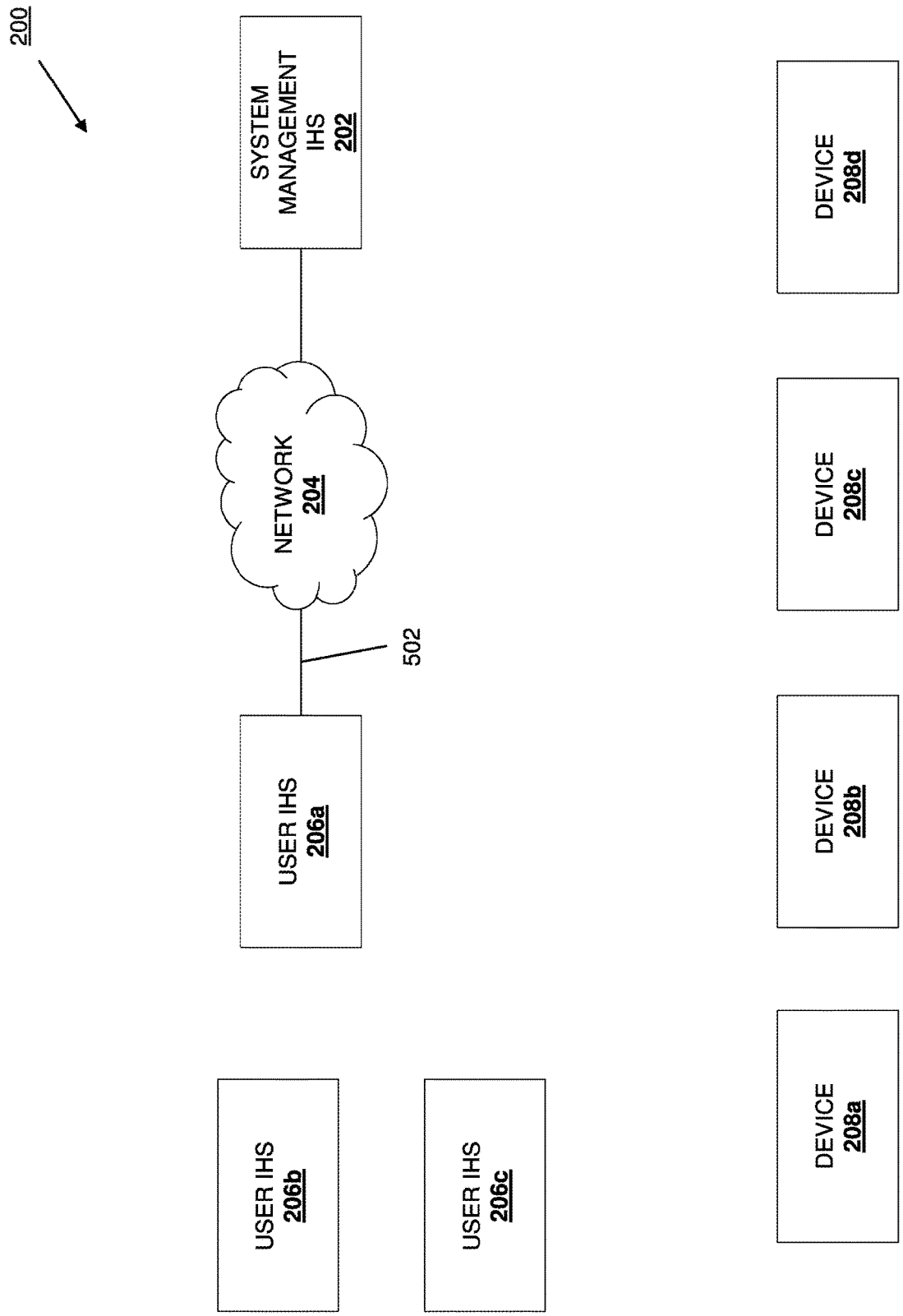
FIG. 5b is a schematic view illustrating an embodiment of a first user IHS providing device information to the system management IHS in the device management system of FIG. 2.

Referring now to FIGS. 2, 4, 5a, 5b, 6a, 6b, 7a, 7b, and 8, embodiments of methods 400 and 800 for managing devices are illustrated and described. The embodiment of the method 400 illustrates the functions of any of the user IHSs 206a-c discussed above in providing the management of the devices 208a-d, while the embodiment of the method 800 illustrates the functions of the system management IHS 202 in providing the management of the devices 208a-d. The method 400 will be described first, followed by the method 800, but one of skill in the art will recognize that the methods 400 and 800 may be performed simultaneously or in different orders while remaining within the scope of the present disclosure. The method 400 begins at decision block 402 where it is determined whether a connection to one or more devices is available. In an embodiment, at decision block 402, any of the user IHSs 206a-c may operate at decision block 402 to determine whether there is an available connection to one or more of the devices 208a-d. For example, FIG. 5a illustrates the user IHS 206a with an available connection 500 to the device 208b, while the user IHSs 206a and 206c do not have an available connection to any of the devices 208a-d. In an embodiment, the user device 206a may have provided the connection 500 (e.g., wired or wireless) to the device 208b to utilize and/or control the device 208b. In another embodiment, the user device 206a may have been brought within an area in which a wireless communication with the device 208b is available (e.g., using an NFC system, a Bluetooth® system, and/or other local wireless communication system in the device 208b), and the connection 500 may have been established (e.g., based on permission of the user of the user IHS 206a, automatically, and/or in a variety of other manners known in the art.) In some embodiments, the connection 500 between the user IHS 206a and the device 208b may exist when the user IHS 206a is not coupled to the network 204, as illustrated. For example, the user IHS 206a may be out of range of the network 204 when connecting to the device 208b. In other embodiments, the connection 500 between the user IHS 206a and the device 208b may exist while the user IHS 206a is also coupled to the network 204. Thus, in the embodiment illustrated in FIG. 5a, at decision block 402 the user IHS 206a determines that there is an available connection 500 to the device 208b, and the user IHSs 206b-c determine that there are no available connections to the devices 208a-d. As can be seen, in response to determining that there is no available connection to device(s), the method 400 proceeds to decision block 408, discussed below.

Figure 6A:
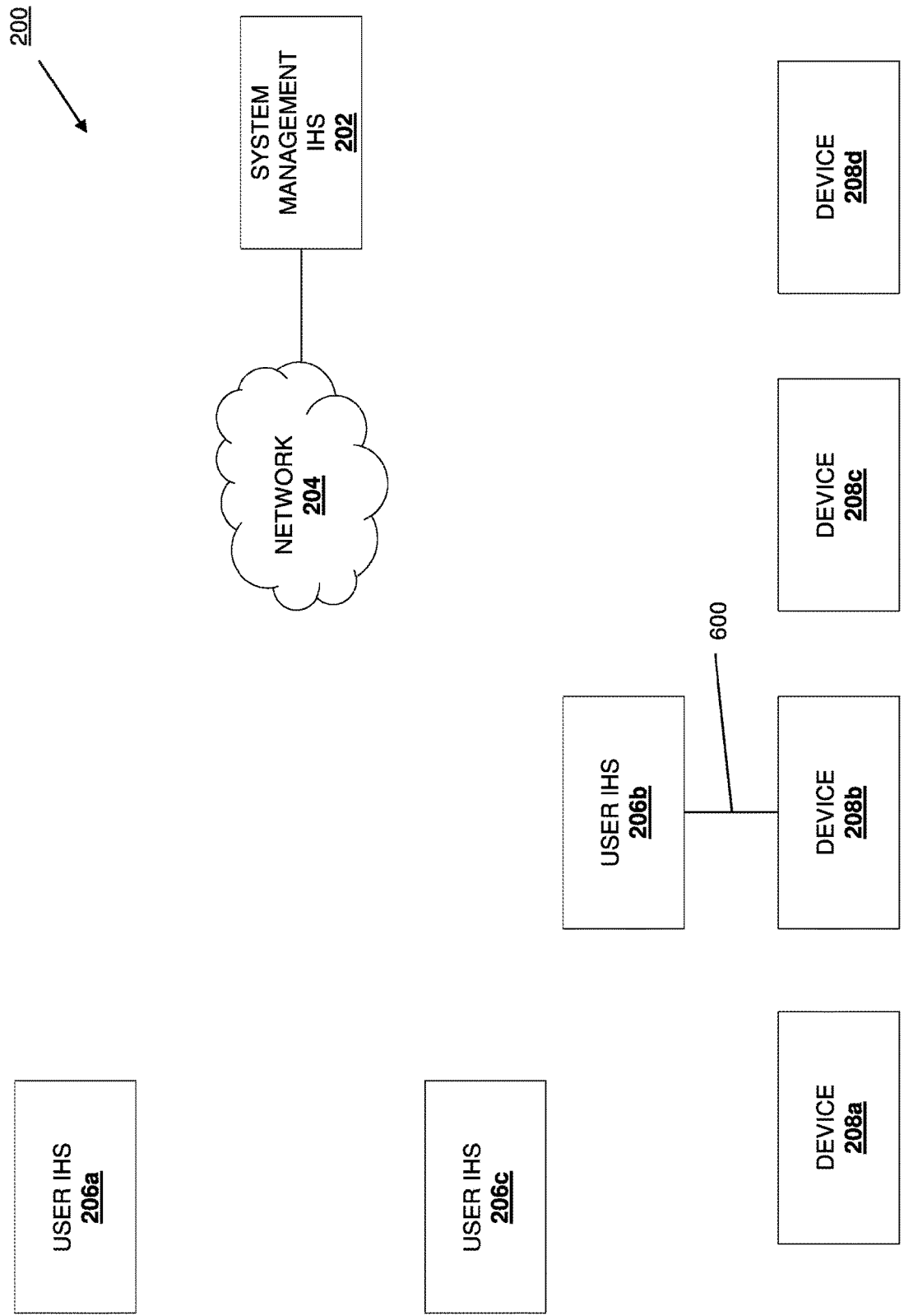
FIG. 6a is a schematic view illustrating an embodiment of a second user IHS retrieving device information from a device in the device management system of FIG. 2.

Similarly, FIG. 6a illustrates the user IHS 206b with an available connection 600 to the device 208b, while the user IHSs 206a and 206c do not have an available connection to any of the devices 208a-d. In an embodiment, the user device 206b may have provided the connection 600 (e.g., wired or wireless) to the device 208b to utilize and/or control the device 208b. In another embodiment, the user device 206b may have been brought within an area in which a wireless communication with the device 208b is available (e.g., using an NFC system, a Bluetooth® system, and/or other local wireless communication system in the device 208b), and the connection 600 may have been established (e.g., based on permission of the user of the user IHS 206b, automatically, and/or in a variety of other manners known in the art.) In some embodiments, the connection 600 between the user IHS 206b and the device 208b may exist when the user IHS 206b is not coupled to the network 204, as illustrated. For example, the user IHS 206b may be out of range of the network 204 when connecting to the device 208b. In other embodiments, the connection 600 between the user IHS 206b and the device 208b may exist while the user IHS 206b is also coupled to the network 204. Thus, in the embodiment illustrated in FIG. 6a, at decision block 402 the user IHS 206*b* determines that there is an available connection 600 to the device 208*b*, and the user IHSs 206*b-c* determine that there are no available connections to the devices 208*a-d*. As can be seen, in response to determining that there is no available connection to device(s), the method 400 proceeds to decision block 408, discussed below.

Figure 7A:
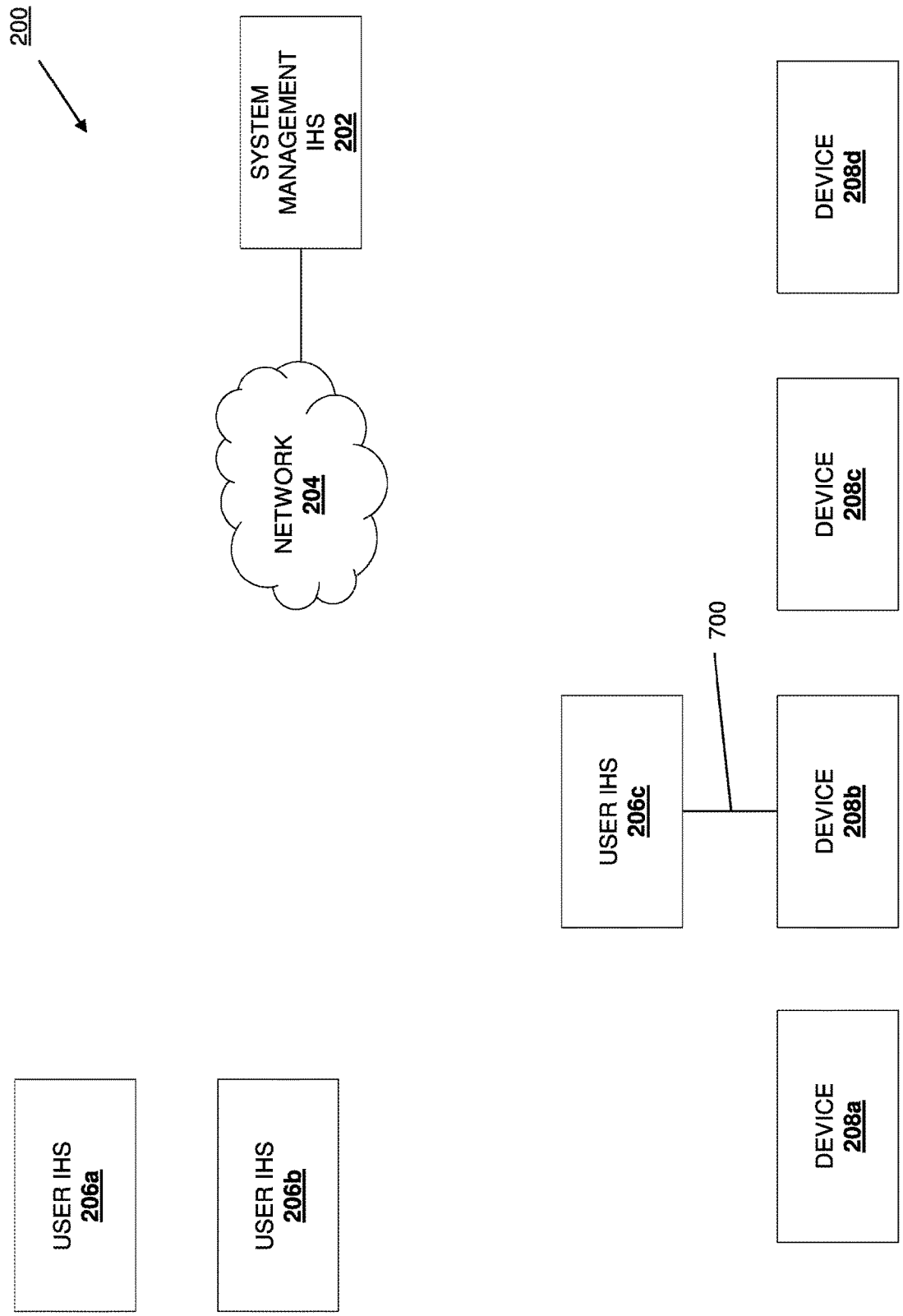
FIG. 7a is a schematic view illustrating an embodiment of a third user IHS retrieving device information from a device in the device management system of FIG. 2.

FIG. 7*a* illustrates the user IHS 206*c* with an available connection 700 to the device 208*b*, while the user IHSs 206*a* and 206*b* do not have an available connection to any of the devices 208*a-d*. In an embodiment, the user device 206*c* may have provided the connection 700 (e.g., wired or wireless) to the device 208*b* to utilize and/or control the device 208*b*. In another embodiment, the user device 206*c* may have been brought within an area in which a wireless communication with the device 208*b* is available (e.g., using an NFC system, a Bluetooth® system, and/or other local wireless communication system in the device 208*b*), and the connection 700 may have been established (e.g., based on permission of the user of the user IHS 206*c*, automatically, and/or in a variety of other manners known in the art.) In some embodiments, the connection 700 between the user IHS 206*c* and the device 208*b* may exist when the user IHS 206*c* is not coupled to the network 204, as illustrated. For example, the user IHS 206*c* may be out of range of the network 204 when connecting to the device 208*b*. In other embodiments, the connection 700 between the user IHS 206*c* and the device 208*b* may exist while the user IHS 206*c* is also coupled to the network 204. Thus, in the embodiment illustrated in FIG. 7*a*, at decision block 402 the user IHS 206*c* determines that there is an available connection 700 to the device 208*b*, and the user IHSs 206*b-c* determine that there are no available connections to the devices 208*a-d*. As can be seen, in response to determining that there is no available connection to device(s), the method 400 proceeds to decision block 408, discussed below. While each of the user IHSs 206*a*, 206*b*, and 206*c* have been illustrated and described as detecting an available connection to a single device (the device 208*b*) in different embodiments, one of skill in the art in possession of the present disclosure will recognize that any or all of the user IHSs 206*a-c* may connect to any of the devices 208*a-d* at the same or different times, and may connect to more than one of the devices 208*a-d* at the same time (e.g., the user IHS 206*a* in FIG. 5*a* may provide the connection to the device 208*b* to utilize and control the device 208*b* while also being within an area in which wireless communication with the devices 208*a* and 208*c* is available and thus connecting to those devices as well.)

The method 400 then proceeds to block 404 where device information is retrieved. In an embodiment illustrated in FIG. 5*a*, at block 404 the user IHS 206*b* operates to retrieve device information from the device 208*b* through the connection 500. In an embodiment, the user IHS 206*a* may include a proxy management agent, a proxy management service, and/or other functionality that is configured to retrieve device information from the device 208*b* through the connection 500. In an embodiment, the retrieval of the device information from the device 208*b* may be performed automatically in response to establishing and/or detecting the connection 500 between the user IHS 206*a* and the device 208*b*. As such, the retrieval of the device information at block 404 may be invisible to the user (e.g., the device information retrieval may occur in the background of the user IHS operating system while the user is performing other tasks). In other embodiments, the retrieval of the device information from the device 208*b* may be performed in response to establishing and/or detecting the connection 500 between the user IHS 206*a* and the device 208*b*, and receiving permission from a user of the user IHS 206*a*. In some embodiments, the retrieval of the device information at block 404 may be performed while the user IHS 206*a* utilizes and/or controls the device 208*b*, while in other embodiments, the retrieval of the device information at block 404 may be the only action performed between the user IHS 206*a* and the device 208*b* following the establishment of the connection 500 (e.g., the device information retrieval may be the purpose of the connection 500). In the embodiments illustrated in FIGS. 6*a* and 7*a*, at block 404 the user IHSs 206*b* and 206*c* may retrieve the device information through the connections 600 and 700, respectively, from the device 208*b* in substantially the same manner as described above for the user IHS 206*a* in FIG. 5*a*. In addition, any of the user IHSs 206*a*, 206*b*, and 206*c* may retrieve device information through an available connection from any of the other devices 208*a*, 208*c*, 208*d* in substantially the same manner as well.

The device information retrieved at block 404 may include any information about the device that is connected to the user IHS. In an embodiment, the device information may include device status information that describes a status of the device, device component status information that describes a status of components in the device, device use information that describes how the device has been used, device sensor information that describes sensor readings captures by sensors in the device, and/or a variety of other device information known in the art. For example, the phone device 310 may provide phone device information such as, for example, a phone status (e.g., phone connectivity, phone use designation, etc.); phone component status information (e.g., phone speaker operation status, phone LED status, etc.); phone use information (e.g., phone calling times, a number of times the phone has been called, a number of times the phone has been answered, etc.); phone sensor information (e.g., a phone location, a phone movement, etc.); and/or a variety of other phone device information known in the art. In another example, the monitor or television device 312 may provide monitor or television device information such as, for example, a monitor or television status (e.g., monitor or television connectivity, monitor or television use designation, etc.); monitor or television component status information (e.g., monitor or television display operation status, monitor or television LED status, etc.); monitor or television use information (e.g., monitor or television operation times, monitor or television channels viewed, etc.); monitor or television sensor information (e.g., a monitor or television location, monitor or television movement, etc.); and/or a variety of other monitor or television device information known in the art.

In another example, the input device 314 may provide input device information such as, for example, a input device status (e.g., input device connectivity, input device use designation, etc.); input device component status information (e.g., keyboard or mouse operation status, keyboard or mouse LED status, input device battery status, etc.); input device use information (e.g., input device operation times, etc.); input device sensor information (e.g., a input device location, input device movement, etc.); and/or a variety of other input device information known in the art. In another example, the printer device 316 may provide printer device information such as, for example, a printer status (e.g., printer connectivity, printer use designation, etc.); printer component status information (e.g., printer toner status, printer mechanical component status, printer paper status, printer paper jam status, etc.); printer use information (e.g., printer operation times, number of pages printed, number of pages scanned, etc.); printer sensor information (e.g., a printer location, printer movement, etc.); and/or a variety of other printer device information known in the art. In another example, the projector device 318 may provide projector device information such as, for example, a projector status (e.g., projector connectivity, projector use designation, etc.); projector component status information (e.g., projector bulb status, projector mechanical component status, projector battery status, etc.); projector use information (e.g., projector operation times, projector bulb life used, etc.); projector sensor information (e.g., a projector location, projector movement, etc.); and/or a variety of other projector device information known in the art.

In another example, the headset device 320 may provide headset device information such as, for example, a headset status (e.g., headset connectivity, headset use designation, etc.); headset component status information (e.g., headset speaker status, headset mechanical component status, headset battery status, etc.); headset use information (e.g., headset operation times, etc.); headset sensor information (e.g., a headset location, headset movement, etc.); and/or a variety of other headset device information known in the art. In another example, the camera device 322 may provide camera device information such as, for example, a camera status (e.g., camera connectivity, camera use designation, etc.); camera component status information (e.g., camera lens status, camera mechanical component status, camera battery status, camera storage status, etc.); camera use information (e.g., camera operation times, camera storage capacity used, etc.); camera sensor information (e.g., a camera location, camera movement, etc.); and/or a variety of other camera device information known in the art. Furthermore, devices such as thermostats may provide use details and temperatures recorded for any time period, devices such as appliances may report use details and component statuses, and devices such vehicles may report use details and component statuses as well. While a few examples have been provided, one of skill in the art in possession of the present disclosure will recognize that any device may provide any device information that is determinable about that device to the user IHSs at block 404.

The method 400 then proceeds to block 406 where device information is stored. In an embodiment illustrated in FIG. 5a, the user IHS 206a may store the device information retrieved at block 404 on a storage device (e.g., the system memory 114 or storage device 108 discussed above with reference to FIG. 1) along with a time stamp identifying the current time, device identifier that identifies the device 208b, and the data included in the device information (discussed above with reference to block 404.) For example, the user IHS 206a may include a device information storage cache for storing any device information that is retrieved from the devices 208a-d. In some embodiments, the user IHS 206a may store device information retrieved for the device 208b along with previous device information that was retrieved and stored for the device 208b (e.g., if that previous device information has not yet been provided to the system management IHS 202, discussed below), while in other embodiments, the device information retrieved at block 406 may replace previous device information that was retrieved and stored for the device 208b. In the embodiments illustrated in FIGS. 6a and 7a, at block 406 the user IHSs 206b and 206c may store the device information retrieved from the device 208b at block 404 in substantially the same manner as described above for the user IHS 206a in FIG. 5a. In addition, any of the user IHSs 206a, 206b, and 206c may store device information that was retrieved at block 404 from any of the other devices 208a, 208c, 208d in substantially the same manner as well.

Following block 406, or in response to determining at decision block 402 that there are no available connections to devices, the method 400 proceeds to decision block 408 where it is determined whether a connection to a system management IHS is available. In an embodiment, at decision block 408, any of the user IHSs 206a-c may operate to determine whether there is an available connection to the system management IHS 202. For example, FIG. 5b illustrates the user IHS 206a with an available connection 502 to the system management IHS 202, while the user IHSs 206a and 206c do not have an available connection to the system management IHS 202. In an embodiment, the user device 206a may have provided the connection 502 (e.g., wired or wireless) to the system management IHS 202 through the network 204. In another embodiment, the user device 206a may have been brought within an area in which a wireless communication to the network 204 (and thus the system management IHS 202) is available (e.g., using an Wifi system), and the connection 502 may have been established (e.g., based on permission of the user of the user IHS 206a, automatically, and/or in a variety of other manners known in the art.) In some embodiments, the connection 502 between the user IHS 206a and the system management IHS 202 may exist when the user IHS 206a is not coupled to any of the devices 208a-d, as illustrated. For example, the user IHS 206a may be out of range of the devices 208a-d when connecting to the network 204. In other embodiments, the connection 502 between the user IHS 206a and the system management IHS 202 may exist while the user IHS 206a is also coupled to any of the devices 208a-d. Thus, in the embodiment illustrated in FIG. 5a, at decision block 408 the user IHS 206a determines that there is an available connection 500 to the system management IHS 202, and the user IHSs 206b-c determine that there are no available connections to the system management IHS 202. As can be seen, in response to determining that there is no available connection to the system management IHS, the method 400 returns to decision block 402.

Similarly, FIG. 6a illustrates the user IHS 206b with an available connection 602 to the system management IHS 202, while the user IHSs 206a and 206c do not have an available connection to the system management IHS 202. In an embodiment, the user device 206b may have provided the connection 602 (e.g., wired or wireless) to the system management IHS 202 through the network 204. In another embodiment, the user device 206b may have been brought within an area in which a wireless communication with the network 204 (and thus the system management IHS 202) is available (e.g., using a Wifi system), and the connection 602 may have been established (e.g., based on permission of the user of the user IHS 206b, automatically, and/or in a variety of other manners known in the art.) In some embodiments, the connection 602 between the user IHS 206b and the system management IHS 202 may exist when the user IHS 206b is not coupled to any of the devices 208a-d, as illustrated. For example, the user IHS 206b may be out of range of the devices 208a-d when connecting to the network 204. In other embodiments, the connection 602 between the user IHS 206b and the system management IHS 202 may exist while the user IHS 206b is also coupled to any of the devices 208a-d. Thus, in the embodiment illustrated in FIG. 6a, at decision block 408 the user IHS 206b determines that there is an available connection 600 to the system management IHS 202, and the user IHSs 206*b-c* determine that there are no available connections to the system management IHS 202. As can be seen, in response to determining that there is no available connection to the system management IHS, the method 400 returns to decision block 402.

FIG. 7*a* illustrates the user IHS 206*c* with an available connection 702 to the system management IHS 202, while the user IHSs 206*a* and 206*b* do not have an available connection to the system management IHS 202. In an embodiment, the user device 206*c* may have provided the connection 702 (e.g., wired or wireless) to the system management IHS 202 through the network 204. In another embodiment, the user device 206*c* may have been brought within an area in which a wireless communication with the network 204 (and thus the system management IHS 202) is available (e.g., using a Wifi system), and the connection 702 may have been established (e.g., based on permission of the user of the user IHS 206*c*, automatically, and/or in a variety of other manners known in the art.) In some embodiments, the connection 702 between the user IHS 206*c* and the system management IHS 202 may exist when the user IHS 206*c* is not coupled to any of the devices 208*a-d*, as illustrated. For example, the user IHS 206*c* may be out of range of the devices 208*a-d* when connecting to the network 204. In other embodiments, the connection 702 between the user IHS 206*c* and the system management IHS 202 may exist while the user IHS 206*c* is also coupled to any of the devices 208*a-d*. Thus, in the embodiment illustrated in FIG. 7*a*, at decision block 402 the user IHS 206*c* determines that there is an available connection 700 to the system management IHS 202, and the user IHSs 206*b-c* determine that there are no available connections to the system management IHS 202. As can be seen, in response to determining that there is no available connection to the system management IHS, the method 400 returns to decision block 402. While each of the user IHSs 206*a*, 206*b*, and 206*c* have been illustrated and described as detecting an available connection to the system management IHS 202 in different embodiments, one of skill in the art in possession of the present disclosure will recognize that any or all of the user IHSs 206*a-c* may connect to the system management IHS 202 (e.g., through the network 204) at the same time.

The method 400 then proceeds to block 410 where the device information is provided to the system management IHS. In an embodiment illustrated in FIG. 5*a*, the user IHS 206*a* provides the device information retrieved at block 404 and stored at block 406 to the system management IHS 202. In an embodiment, the provision of the device information to the system management IHS 202 may be performed automatically in response to establishing and/or detecting the connection 502 between the user IHS 206*a* and the system management IHS 202. As such, the provision of the device information at block 410 may be invisible to the user (e.g., the device information provision may occur in the background of the user IHS operating system while the user is performing other tasks). In other embodiments, the provision of the device information to the system management IHS 202 may be performed in response to establishing and/or detecting the connection 502 between the user IHS 206*a* and the system management IHS 202 and receiving permission from a user of the user IHS 206*a*.

In one example, the device information provided at block 410 may include a time stamp identifying the time the device information was retrieved, a device identifier identifying the device that the device information was retrieved from (e.g., the device 208*b*), a user IHS identifier identifying the user IHS providing the device information, a user identifier identifying the user of the user IHS providing the device information, the data included in the device information (discussed above with reference to block 404), and/or any other information known in the art that was retrieved from the device and stored and/or that is associated with the user IHS providing the device information. In the embodiments illustrated in FIGS. 6*a* and 7*a*, at block 410 the user IHSs 206*b* and 206*c* may provide the device information retrieved at block 404 and stored at block 406 in substantially the same manner as described above for the user IHS 206*a* in FIG. 5*a*. The method 400 then returns back to decision block 402. Thus, some embodiments of the method 400 provide for each of the user IHSs 206*a-c* in the device management system 200 to connect to any of the devices 208*a-d* when a connection is available, retrieve and store device information from those devices, connect to the system management IHS 202 when a connection to the network 204 is available, and provide any device information that has been retrieved to the system management IHS. Furthermore, in some embodiments of the method 400, any of the user IHSs 206*a-d* may be connected to any of the devices 208*a-d* and the network 204 at the same time such that the storage of the device information is not necessary and device information may be retrieved from a device and provided to the system management IHS 202. As such, device information from devices 208*a-d* that are not configured to communicate with the system management IHS 202 may be retrieved by user IHSs 206*a-c* that periodically communicate with those devices 208*a-d*, and the provided to the system management IHS 202 when those user IHSs 206*a-c* communicatively couple to the network 204.

Figure 6B:
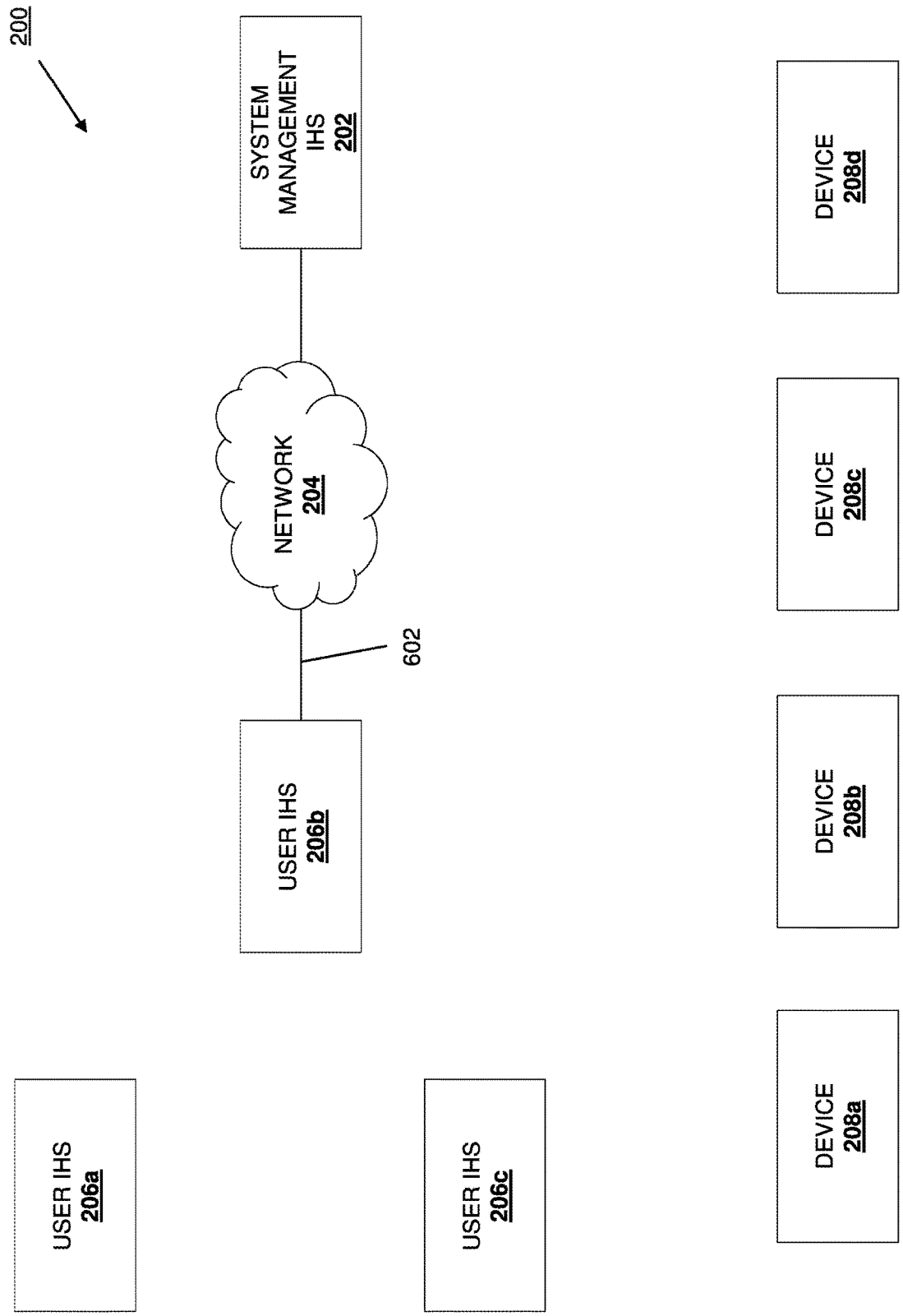
FIG. 6b is a schematic view illustrating an embodiment of a second user IHS providing device information to the system management IHS in the device management system of FIG. 2.
Figure 7B:
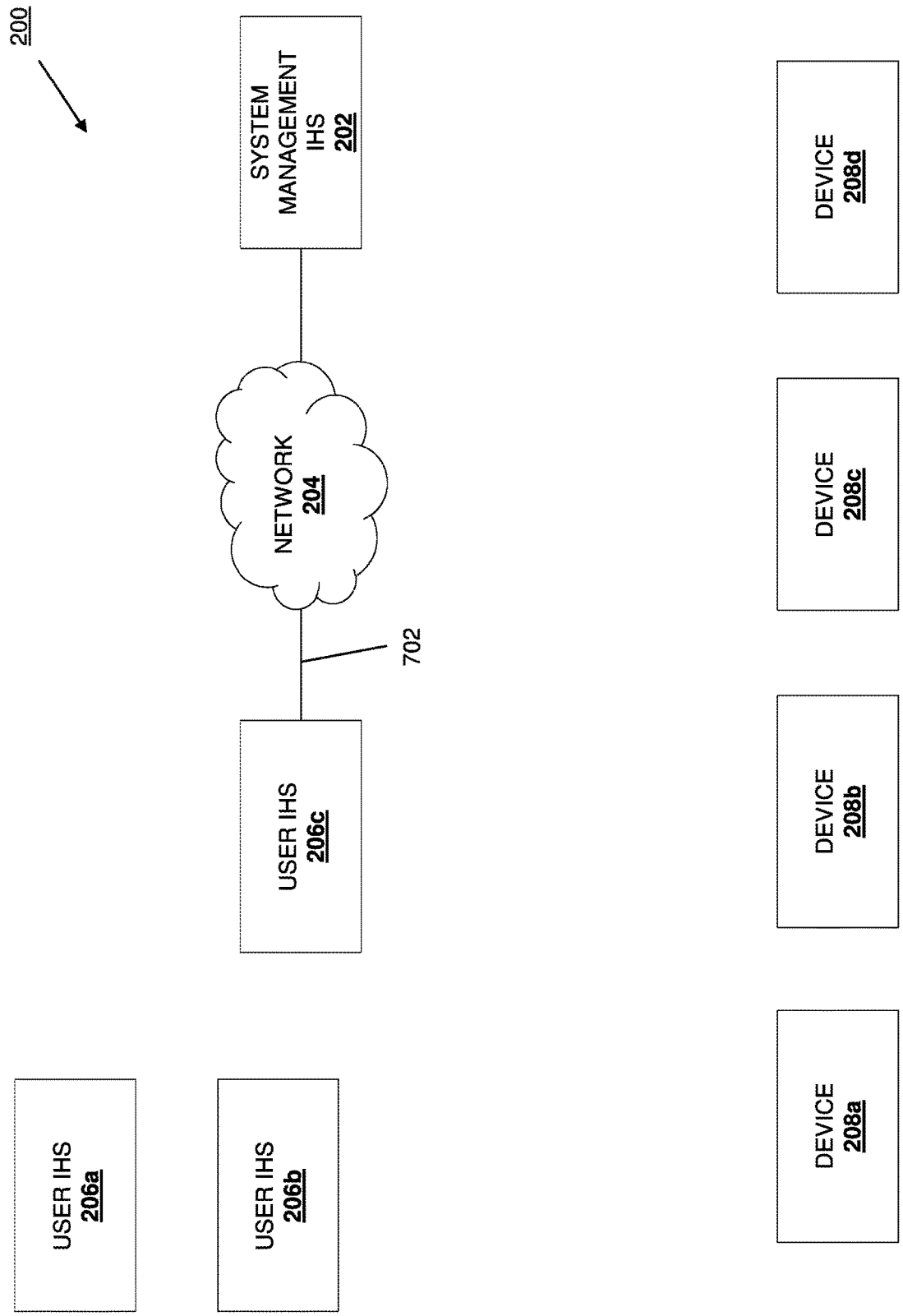
FIG. 7b is a schematic view illustrating an embodiment of a third user IHS providing device information to the system management IHS in the device management system of FIG. 2.
Figure 8:
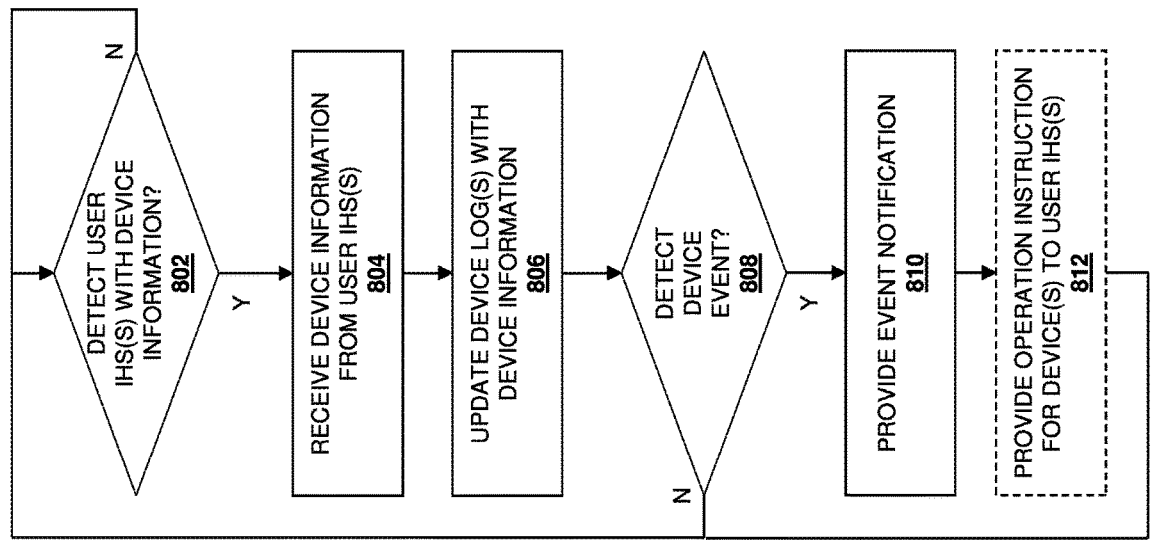
FIG. 8 is a flow chart illustrated an embodiment of a method for managing devices that may be performed by a system management IHS.

Referring now to FIG. 8, the method 800 begins at decision block 802 where it is determined whether a user IHS with device information is detected. In an embodiment, the system management IHS 202 is configured to detect user IHSs that are connected to the network 204 (e.g., as illustrated in FIGS. 5*b*, 6*b*, and 7*b*) and that include device information retrieved from the devices 208*a-d* according to the method 400. For example, the system management IHS 202 may detect the connection of a user IHS to the network 204, and then may access a storage device or application on the user IHS to determine whether device information is stored on the user IHS. In another example, when a user IHS connects to the network 204, that user IHS may communicate with the system management IHS 202 to inform the system management IHS 202 that it includes stored device information. If the system management IHS does not detect user IHSs that are connected to the network 204 and that include device information, the method 400 returns to decision block 802 and continues to attempt to detect a user IHS with device information.

If, at decision block 802, a user IHS with device information is detected, the method 800 proceeds to block 804 where device information is received from the user IHS. In an embodiment, the system management IHS 202 operates at block 804 to receive device information from the user IHS substantially as discussed above with reference to block 410. The method 800 then proceeds to block 806 where device logs are updated with device information. In embodiment, the system management IHS 202 stores the device information received at block 804 in a database in association with the device from which that device information was retrieved. For example, the system management IHS 202 may include a memory system and/or storage device that includes a database having device logs for each device for which device information is received. As such, at any given time, the database may include device logs for any device for which device information was previously received, and the system management IHS 202 may be configured to create a device log when device information is received for a device that is not currently associated with a device log in the database. Upon receiving device information, the system management IHS 202 may use the device identifier that identifies the device that the device information was retrieved from (e.g., the device 208*b*) to find the device log for that device (or determine that no device log exists), use the time stamp identifying the time the device information was retrieved to store the device information in the order it was retrieved for that device, and store the data included in the device information. As such, the device log for a given device (e.g., the device 208*b*) may provide device history information that includes the device information provided by the user IHS 206*a* in FIG. 5*a*, the device information provided by the user IHS 206*b* in FIG. 6*a*, and the device information provided by the user IHS 206*c* in FIG. 7*a*. Thus, the system management IHS 202 may include device logs that provide device history information for each of the plurality of devices 208*a-d* that are not configured to communicate with the system management IHS 202.

The method 800 then proceeds to decision block 808 where it is determined whether a device event is detected. In an embodiment, at decision block 808 the system management IHS 202 analyzes the device information received at block 804 to determine whether that device information includes event information that describes an event for which a notification is to be provided. For example, a variety of device information may be associated with events (e.g., by a system administrator) that are to result in notifications (e.g., to a user, to the system administrator, to an Information Technology (IT) service, etc.) such as, for example, device failures, device component failures, device malfunctions, device component malfunctions, and or a variety of other device events known in the art. In a specific example, a printer device may be running low on toner, which may be reported as printer component event information and result in the detection of an event (e.g. a low toner event.) In another specific example, a projector device may have a bulb that is dying and does not emit a sufficient amount of light, which may be reported as projector component event information and result in the detection of an event (e.g. a dim bulb event.) Given the wide variety of device information that is retrievable from the devices 208*a-d*, discussed above, one of skill in the art in possession of the present disclosure will recognize that a wide variety of device information may be event information that can result in the detection of an event at decision block 808. If no event is detected at decision block 808, the method 800 returns to decision block 802. If an event is detected at decision block 808, the method 800 proceeds to block 810. However, the device information analyzed at decision block 808 may be used to update a device status for its related device regardless of whether it is event information that results in the detection of an event at decision block 808. For example, if no event is detected at decision block 808, the device status of the device that has not experienced an event may be updated as "running", "operating", "active", or otherwise not experiencing any events. If an event is detected at decision block 808, the device status of the device that has experienced an event may be updated as "down", "inactive", with an indicated of the event that device has experience (e.g., "low toner"), or otherwise experiencing an event.

At block 810, an event notification is provided. In an embodiment, the system management IHS 202 is configured to provide an event notification in response to detecting an event at decision block 808 by, for example, displaying the event notification on a display device coupled to the system management IHS 202, sending an event notification over the network 204 to a management console (e.g., similar to the user IHSs discussed above but operated by a system administrator), providing an event notification on one or more of the user IHSs 206*a-c* (e.g., to the user IHS that provided the device information that resulted in the detection of the event, to a user IHS that did not provide the device information that resulted in the detection of the event, etc.), and/or providing an event notification to a variety of other entities known in the art. For example, event notifications may be provided to any user IHSs that have previously provided device information for the device experiencing the event. In an embodiment, the event notification may include the time of retrieval of the device information that resulted in the detected event, the device identifier for the device experiencing the event, a description of the event, and/or any other event notification information known in the art. The event notification may be provided as a graphical display, an email, a text message, on a software application, as a sound file that is executable by a system to produce a sound, etc.

The method 800 may then proceeds to optional block 812 where an operation instruction is provided for device(s) to user IHS(s). In an embodiment, the system management IHS 202 may be configured to provide operation instructions to any of the devices 208*a-d* by providing an instruction to any of the user IHSs 206*a-c* when those user IHSs are connected to the network 204 (as illustrated in FIGS. 5*b*, 6*b*, and 7*b*), and have that operation instruction provided to the appropriate device 208*a-d* when one of those user IHSs is connected to that device (as illustrated in FIGS. 5*a*, 6*a*, and 7*a*). In an embodiment, operation instructions may be provided by the system management IHS 202 in response to any device information received, whether that device information results in a detected event or not, or may be provided based on any other operation information provision scenario known in the art. The same operation information may be provided to multiple user IHS's, and each IHS may be configured to check a device for which it has operation information in order to determine whether that operation information has already been provided by another user IHS. The method 800 then returns to decision block 802.

Thus, systems and methods have been described that provide a plurality of devices that are not networked or are otherwise unable to communicate with a system management IHS, and use a plurality of user IHSs that are configured to connect (periodically or otherwise) to the devices and to the system management IHS (e.g., through a network) to retrieve device information from the devices and report that device information to the system management IHS. This allows the system management IHS to inventory, manage, and monitor the plurality of devices that would otherwise be inaccessible or invisible to the system management IHS, while also allowing for the quick detection and reporting of failures, malfunctions, and/or other device events to reduce downtime of those devices. In some embodiments, the system management IHS may be configured to send instructions to the devices through the user IHSs to alter the operation of those devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device management system, comprising:
a system management device that is coupled to a network;
a first managed device that is not connected to the network such that the first managed device cannot directly communicate with the system management device; and
a first user device that is configured to:
establish a first communication connection with the first managed device without the use of the network;
retrieve, from the first managed device using the first communication connection, first managed device information about the first managed device;
establish, subsequent to retrieving the first managed device information from the first managed device, a second communication connection with the system management device using the network; and
provide, through the network to the system management device using the second communication connection, at least one first notification that is based on the first managed device information that was retrieved from the first managed device by the first user device using the first communication connection before the first user device established the second communication connection with the system management device using the network.

2. The system of claim 1, wherein the network is a Local Area Network (LAN).

3. The system of claim 1, wherein the system management device is configured to:
provide, through the network to the first user device, at least one operation instruction for the first managed device.

4. The system of claim 1, further comprising:
at least one second managed device that is not connected to the network such that the at least one second managed device cannot directly communicate with the system management device, wherein the first user device is configured to:
establish a respective third communication connection with each at least one second managed device without the use of the network;
retrieve, from each at least one second managed device using the respective third communication connection established with that second managed device, respective second managed device information about that second managed device;
establish, subsequent to retrieving the respective second managed device information from each at least one second managed device, a fourth communication connection with the system management device using the network; and
provide, through the network to the system management device using the fourth communication connection, the respective second managed device information retrieved from each at least one second managed device.

5. The system of claim 1, further comprising:
a second user device, wherein the system management device is configured to:
establish, subsequent to receiving the first managed device information from the first user device, a third communication connection with the second user device using the network; and
send, through the network to the second user device using the third communication connection, at least one operation instruction for the first managed device, wherein the second user device is configured to:
establish a fourth communication connection with the first managed device without the use of the network; and
provide, to the first managed device using the fourth communication connection, the at least one operation instruction.

6. The system of claim 1, wherein the first user device establishes the first communication connection with the first managed device and retrieves the first managed device information using the first communication connection while the first user device is not connected to the network such that the first user device cannot directly communicate with the system management device; and
wherein the first user device establishes the second communication connection with the system management device and provides the first managed device information using the second communication connection while the first user device is not communicatively connected to the first managed device such that the first user device cannot directly communicate with the first managed device.

7. The system of claim 1, wherein the system management device is configured to:
determine that first managed device information includes event information; and
provide, in response to determining that the first managed device information includes event information, an event notification.

8. An information handling system (IHS), comprising:
a processing system; and
a memory system that is coupled to the processing system and that includes instructions that, when executed by the processing system, cause the processing system to provide a system manager that is coupled to a network and that is configured to:
establish a first communication connection with a first user device using the network;
receive, from the first user device through the first communication connection, first managed device information about a first managed device that is not connected to the network such that the first managed device cannot directly communicate with the system manager, wherein the first managed device information was retrieved by the first user device from the first managed device using a second communication connection prior to the system manager establishing the first communication connection with the first user device; and
provide at least one first notification that is based on the first managed device information about the first managed device.

9. The IHS of claim 8, wherein the network is a Local Area Network (LAN).

10. The IHS of claim 8, wherein the system manager is configured to:
communicate with a second user device through the network to cause the second user device to subsequently provide at least one operation instruction to the first managed device using a third communication connection to the first managed device.

11. The IHS of claim 8, wherein the system manager is configured to:
receive, from the first user device through the network, second managed device information about a second managed device that is not connected to the network such that the second managed device cannot directly communicate with the system manager, wherein the second managed device information was retrieved by the first user device from the second managed device using a third communication connection prior to the system manager establishing the first communication connection with the first user device; and provide at least one second notification that is based on the second managed device information about the second managed device.

12. The IHS of claim 8, wherein the first user device retrieves the first managed device information using the second communication connection with the first managed device while the first user device is not connected to the network such that the first user device cannot directly communicate with the system manager; and wherein the first user device provides the first managed device information to the system manager through the network while the first user device is not communicatively connected to the first managed device such that the first user device cannot directly communicate with the first managed device.

13. The IHS of claim 8, wherein the system manager is configured to:

communicate with the first user device through the network to cause the first user device to subsequently provide at least one operation instruction to the first managed device using a third communication connection to the first managed device that is established subsequent to the second communication connection.

14. A method for managing devices, comprising:

establishing, by a system management device, a first communication connection with a first user device using a network;

receiving, by the system management device through the first communication connection using the network from the first user device, first managed device information about a first managed device that is not connected to the network such that the first managed device cannot directly communicate with the system management device, wherein the first managed device information was retrieved by the first user device from the first managed device using a second communication connection prior to the system manager device establishing the first communication connection with the first user device;

determining, by the system management device, that the first managed device information about the first managed device is associated with at least one notification event; and providing, by the system management device in response to determining that the first managed device information about the first managed device is associated with at least one notification event, at least one first notification.

15. The method of claim 14, wherein the network is a Local Area Network (LAN).

16. The method of claim 14, further comprising:

communicating, by the system management device, with a second user device through the network to cause the second user device to subsequently provide at least one operation instruction to the first managed device using a third communication connection to the first managed device.

17. The method of claim 14, further comprising:

receiving, by the system management device through the network from the first user device, second managed device information about a second managed device that is not connected to the network such that the second managed device cannot directly communicate with the system management device, wherein the second managed device information was retrieved by the first user device from the second managed device using a third communication connection prior to the system management device establishing the first communication connection with the first user device;

determining, by the system management device, that the second managed device information about the second managed device is associated with at least one notification event; and providing, by the system management device in response to determining that the second managed device information about the second managed device is associated with at least one notification event, at least one second notification.

18. The method of claim 14, wherein the first user device retrieves the first managed device information using the second communication connection with the first managed device while the first user device is not connected to the network such that the first user device cannot directly communicate with the system management device; and wherein the first user device provides the first managed device information to the system management device through the first communication connection while the first user device is not communicatively connected to the first managed device through the second communication connection such that the first user device cannot directly communicate with the first managed device.

19. The method of claim 14, further comprising:

communicating, by the system management device, with the first user device through the network to cause the first user device to subsequently provide at least one operation instruction to the first managed device using a third communication connection to the first managed device that is established subsequent to the second communication connection.

20. The method of claim 14, further comprising:

updating, by the system management device, a first managed device status associated with the first managed device using the first managed device information for the first managed device.

* * * * *